United States Patent
White

(10) Patent No.: US 9,504,259 B2
(45) Date of Patent: Nov. 29, 2016

(54) COOKIE CUTTER FOR CONCURRENTLY CUTTING A PLURALITY OF COOKIES

(76) Inventor: Rhonda Kay White, Bryan, TX (US)

( * ) Notice: Subject to any disclaimer, the term of this patent is extended or adjusted under 35 U.S.C. 154(b) by 1129 days.

(21) Appl. No.: 13/105,158

(22) Filed: May 11, 2011

(65) Prior Publication Data
US 2011/0283548 A1    Nov. 24, 2011

Related U.S. Application Data

(60) Provisional application No. 61/346,807, filed on May 20, 2010.

(51) Int. Cl.
| | |
|---|---|
| A21C 11/10 | (2006.01) |
| B26D 7/00 | (2006.01) |
| B26D 11/00 | (2006.01) |
| B26F 1/32 | (2006.01) |
| B26D 7/18 | (2006.01) |
| B26F 1/14 | (2006.01) |
| B26F 1/46 | (2006.01) |

(52) U.S. Cl.
CPC ........... *A21C 11/106* (2013.01); *B26D 7/1818* (2013.01); *B26D 11/00* (2013.01); *B26F 1/14* (2013.01); *B26F 1/32* (2013.01); *B26F 1/46* (2013.01); *B26D 2210/02* (2013.01); *B26F 2210/00* (2013.01); *Y10S 83/932* (2013.01); *Y10T 83/2122* (2015.04); *Y10T 83/8832* (2015.04); *Y10T 83/8834* (2015.04); *Y10T 83/9304* (2015.04); *Y10T 83/943* (2015.04); *Y10T 83/944* (2015.04); *Y10T 83/9449* (2015.04)

(58) Field of Classification Search
CPC ... A21C 11/103; A21C 11/106; B26D 11/00; B26D 7/1818; B26D 2210/02; B26F 1/46; B26F 1/02; B26F 1/14; B26F 1/32; B26F 1/3846; B26F 2210/00; Y10S 83/932; Y10T 83/2122; Y10T 83/8832; Y10T 83/8834; Y10T 83/9304; Y10T 83/943; Y10T 83/944; Y10T 83/9447; Y10T 83/9449

USPC ......... 83/621, 622, 656, 687, 691, 694, 695, 83/123, 128, 932; 30/299, 301; 425/298, 425/306, 307, 299; 426/143, 484, 485, 499, 426/503, 518

See application file for complete search history.

(56) References Cited

U.S. PATENT DOCUMENTS

| | | | | |
|---|---|---|---|---|
| 176,217 | A | * | 4/1876 | Collins ........................... 30/301 |
| 268,886 | A | * | 12/1882 | Hall ............................... 30/130 |
| 700,725 | A | * | 5/1902 | Bone .............................. 30/301 |
| 730,792 | A | * | 6/1903 | Oliver ............................ 30/130 |
| 766,178 | A | * | 8/1904 | Gardner ......................... 30/301 |
| 915,611 | A | * | 3/1909 | Lane .............................. 30/301 |
| 1,236,620 | A | * | 8/1917 | Storment et al. ............... 30/130 |
| 1,459,296 | A | * | 6/1923 | Stambaugh .................... 30/301 |
| 1,486,810 | A | * | 3/1924 | Stauffer ......................... 30/301 |
| 1,618,685 | A | * | 2/1927 | Stauffer ......................... 30/130 |
| 1,752,107 | A | * | 3/1930 | Plater ..................... A21C 11/10 425/196 |
| 1,806,266 | A | * | 5/1931 | Sawle ............................ 30/130 |
| 2,163,641 | A | * | 6/1939 | Wales ............................ 83/155 |

(Continued)

*Primary Examiner* — Clark F Dexter
(74) *Attorney, Agent, or Firm* — Polsinelli PC

(57) ABSTRACT

A device for simultaneous cutting of dough into shapes including upper and lower platform members as well as interior and exterior cutting members. The upper platform member may be actuated to cause the interior cutting members to be telescopically inserted into the exterior cutting members thereby enabling cutting of prepared cookie dough into a plural cookies by each set of interior and exterior cutting members.

11 Claims, 9 Drawing Sheets

(56) References Cited

U.S. PATENT DOCUMENTS

| | | | |
|---|---|---|---|
| 2,246,424 A * | 6/1941 | Turner | 426/512 |
| 2,317,424 A * | 4/1943 | Wales | 83/140 |
| 2,346,242 A * | 4/1944 | Turner | 30/359 |
| 2,370,650 A * | 3/1945 | Fitzsimmons | 30/301 |
| 2,415,976 A * | 2/1947 | Thorud | 30/130 |
| 2,799,929 A * | 7/1957 | Kurianski | 30/301 |
| 3,667,519 A * | 6/1972 | Shadduck | 30/263 |
| 4,083,666 A | 4/1978 | Richardson | |
| D249,440 S | 9/1978 | Doyel | |
| 4,192,899 A * | 3/1980 | Roth | 426/513 |
| 4,572,444 A * | 2/1986 | Shadduck | 241/168 |
| 4,865,862 A | 9/1989 | McFeaters et al. | |
| 5,062,356 A | 11/1991 | Frankowski | |
| 5,063,839 A | 11/1991 | McFeaters et al. | |
| 5,954,561 A | 9/1999 | Cannone | |
| 6,386,854 B1 | 5/2002 | Guss | |
| D484,755 S | 1/2004 | Shonfeld et al. | |
| 6,701,828 B1 | 3/2004 | Burns et al. | |
| 6,708,853 B1 | 3/2004 | Melling | |
| 2002/0179645 A1 | 12/2002 | So | |
| 2004/0187706 A1 | 9/2004 | Glucksman et al. | |
| 2008/0276782 A1 | 11/2008 | Senkalski et al. | |
| 2012/0207899 A1 * | 8/2012 | Serebryany et al. | 426/499 |

* cited by examiner

US 9,504,259 B2

COOKIE CUTTER FOR CONCURRENTLY CUTTING A PLURALITY OF COOKIES

CROSS-REFERENCE TO RELATED APPLICATION

This application claims priority to U.S. provisional application No. 61/346,807, filed May 20, 2010, which is fully incorporated by reference herein.

TECHNICAL FIELD

The present disclosure relates generally to dough cutters for cookies and more specifically to dough cutters for concurrently cutting a plurality of uniformly shaped cookies. In particular it relates to a cookie cutter having a plurality of actuable cutting members with external and internal cutting members for forming specific shapes in dough. At least three separate cookies can thereby be formed by the outer and inner cutting members.

BACKGROUND

Cookies are well known and well regarded for their enjoyment and taste throughout the world. For preparation of cookies, a dough material is generally first prepared. The dough material can either be pre-made and sold in stores or "homemade" from original component ingredients. The dough is then taken by a user and placed in a pan to be cooked or baked until ready to eat. There is an enormous number of types of cookies which are made, each depending on the ingredients used, limited only by people's creativity. Some examples of cookies include chocolate chip, sugar, oatmeal, peanut butter, just to name a few. Further, these can made in various shapes. However, when generating a large number of cookies from dough material, the preparation can become laborious, especially for those making them at home. What is needed therefore is a device and/or process for aiding the formation of cookies from dough.

SUMMARY

In one embodiment of the present disclosure, a cookie cutting apparatus for concurrently cutting a plurality of cookies in dough is provided. The component parts of the apparatus include an upper platform member having an array of interior cutting members having a first diameter with a cutting surface on an end thereof, a lower platform member having an array of exterior cutting members having a second diameter and a cutting surface on an end thereof, the first diameter being smaller than the second diameter, the upper platform member arranged above the lower platform member and aligning the interior cutting members with respective axes of the exterior cutting members, wherein the upper platform member is actuable from a first configuration where the array of interior cutting members is in a raised position, to a second configuration where the interior cutting members are telescopically inserted into the exterior cutting members in a lowered position such that the cutting surfaces of said interior cutting members are in substantially the same plane as the cutting surfaces of said exterior cutting members.

In other embodiments, a biasing element is interposed between said upper platform member and said lower platform member thereby biasing said upper platform member to a raised position. Further, the interior cutting members are cylindrical having a hollowed interior to cut a circular shape. Additionally, the exterior cutting members are cylindrical having a hollowed interior to cut a circular shape.

Moreover, in some embodiments, the first and second diameters allow for a space between respective interior cutting members and exterior cutting members when the interior cutting members are inserted therein. The exterior cutting members each may have an aperture to allow air to escape.

In further embodiments, the interior and exterior cutting surfaces have different shapes. In other embodiments, the upper and lower platform members have a proximate rectangular shape with one length extending longer in one longitudinal direction. Additionally, the lower platform member may have a lateral extension member which extends beyond the length of said upper platform for gripping by user.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

DETAILED DESCRIPTION

As required, detailed description of embodiments of the present invention are disclosed herein, however, it is to be understood that the disclosed embodiments are merely exemplary of the invention that may be embodied in various and alternative forms. The figures are not necessarily to scale. Some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1A:
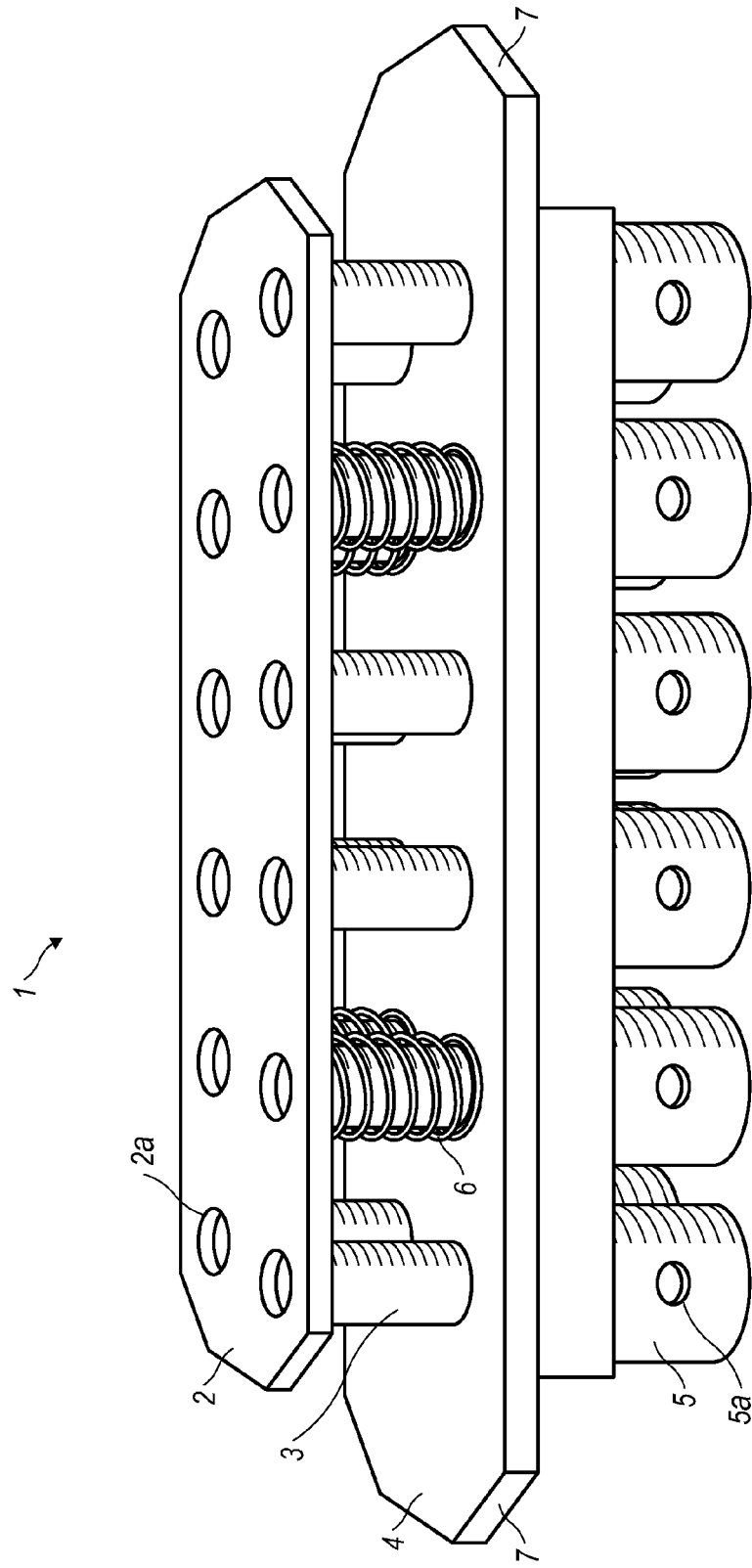
FIG. 1A is a perspective view of one embodiment of a cookie cutting apparatus for concurrently cutting a plurality of cookies.

Referring to the Figures, one exemplary embodiment of the cookie cutter device 1 is illustrated in FIG. 1A. As shown therein the cookie cutter device 1 has a moveable upper platform member 2 above a lower platform member 4. The upper platform member 2 is generally of an essentially rectangular planar shape and is arranged parallel to the lower platform member 4. As it is rectangular, there is one length extending longer in a longitudinal direction as compared to its other side. Other shapes may successfully be employed for example, oval, elliptical, circular, or multiple sided shapes. Generally, the shape should enable a user to place downward pressure on the platform members.

The upper platform member 2 will have a plurality of interior cutting members 3 on its underside which face in a downward direction. In the example shown there are two rows of six interior cutting members 3, however it will be understood that a wide variety of cutting members may be used. Furthermore, there may one row or alternatively several rows employed, or may also be arranged in any number of ways, circular rows, elliptical rows, etc. Preferably there are anywhere from 6 to 20 cutting members employed. It will be understood by those in the art that the more cutting members may cause the device 1 to become too bulky, whereas too few cutting members may reduce the efficiency.

The interior cutting members 3 are generally cylindrical shape with a hollowed center. Furthermore, the upper platform member 2 has an aperture 2a at each cutting member, such that a hollow is formed through the upper platform member down to the cutting surface of the interior cutting members 3. The cutting members 3 may be attached to the upper platform member 2 either by welding or threaded elements. Accordingly, it can be permanently attached or removably attached.

The upper platform member 2 has a first configuration where it is raised above the lower platform member 4. In the embodiment shown the upper platform member 2 is raised several inches. In other embodiments, the upper platform member 2 may be raised at a different raised height, however, it should preferably be raised such that the bottom cutting surfaces are raised above the height of any cookie dough at the bottom thereof.

Further, set between the upper platform member 2 and the lower platform member 4 is a biasing element. In the embodiment shown, the biasing element comprises a circular spring member 6 fixed around four of the interior cutting members 3. Fewer spring members may be employed, or up to one for every cutting member 3. However, it will be understood the biasing element should be sufficiently strong to maintain the upper platform member 2 in the raised configuration, but also allow for a user to push the upper platform member to a lower second configuration.

As further illustrated in FIG. 1A, the lower platform member 4 has a planar top surface, and is essentially rectangular. Furthermore, there are handles 7 at each longitudinal end of lower platform member 4 for gripping by a user. In the embodiment shown in FIG. 1A, the handles are planar extensions, however, in other embodiments, it will be understood that the handles could have handle grips to aid in grasping. The lower platform member 4 contains apertures which the interior cutting members 3 pass through. Additionally, on the underside of the lower platform member 4, there are exterior cutting members 5. In the embodiment shown, there are an equal number of exterior cutting members 5 as interior cutting members 3, however, in other embodiments there may be a greater number of exterior cutting members. The exterior cutting members 5 are cylindrical in shape.

The interior cutting members 3 are arranged such that they are aligned with respective axes of the exterior cutting members 5. Further, the interior cutting members 3 are configured such that their diameters or cross sections are smaller than those of the exterior cutting members 5, so that they may be wholly contained within the cutting members 5 and without touching the sides. When the upper platform member 2 is actuated by pushing downward, the interior cutting members 3 are telescopically inserted into the exterior cutting members 5.

Figure 1B:
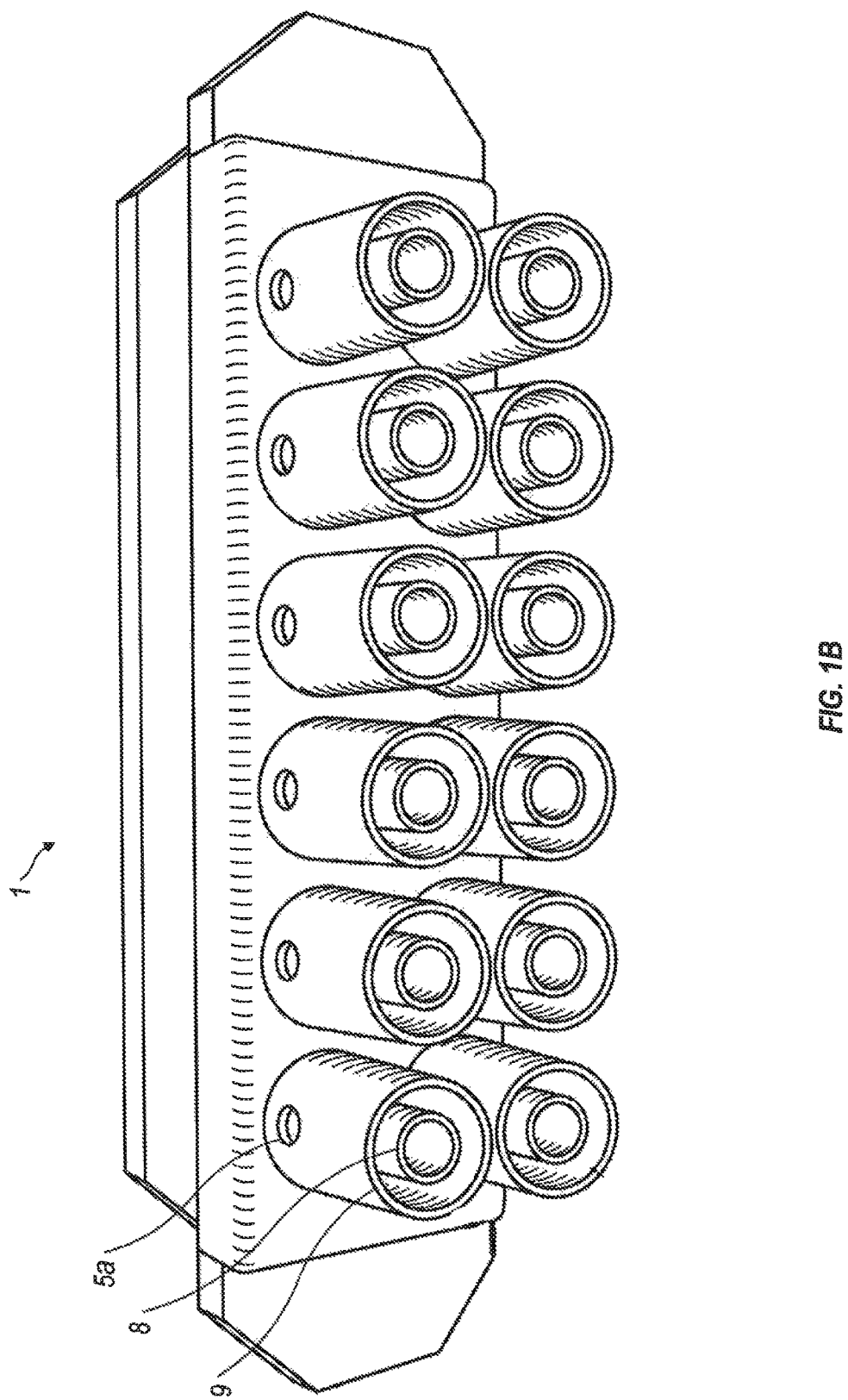
FIG. 1B is a perspective view of the underside of the embodiment illustrated in FIG. 1A.

The bottom portion of cutting device 1 is depicted in FIG. 1B. As shown therein, the bottom of the interior and exterior cutting members each have cutting surfaces capable of cutting through cookie dough. Upon actuation of the upper platform member 2, the interior cutting members 3 are telescopically moved downward until the interior cutting surface 8 of the interior cutting members 3 are in the substantially the same plane as the exterior cutting surfaces 9 of the exterior cutting members 5. In some embodiments, for example shown in FIG. 2, the interior cutting surfaces 8 of the interior cutting members 3 will be urged past the exterior cutting surfaces 9.

Therefore, when a user is cutting shapes in a piece of dough, the user will first place the dough on a table or surface for cutting. A user can then take the cutting device 1 and press it into the dough. The exterior cutting surfaces 9 will have the effect of cutting the dough in the same shape as the exterior cutting surfaces 9. Furthermore, if the upper platform member 2 is not actuated, then only the exterior cutting members 5 will serve to cut the dough. This will have the effect of cutting an array of cookies in the dough which are in one solid piece.

A user can also cut the dough in a manner to create two cookies. This is conducted by the user pushing the cutter device 1 into cookie dough that is prepared on a surface. The exterior cutting surfaces 9 will have the effect of cutting the dough in the same shape as that of the exterior cutting surfaces 9. Additionally, a user may then actuate the upper platform member 2 by pushing downwards on it. This will cause the interior cutting members 3 to telescope downwards through the exterior cutting surfaces 9. The interior cutting surfaces 8 of the interior cutting members 3 will additionally cut the dough in the same shape as the interior cutting surfaces 8.

Figure 3:
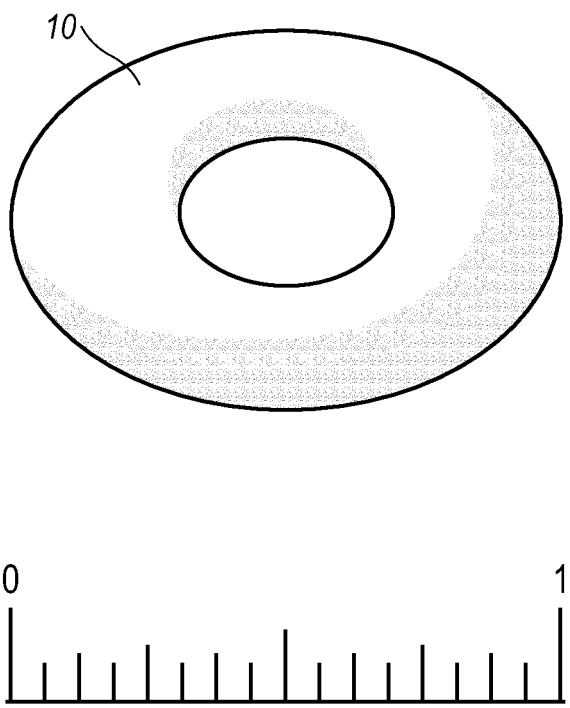
FIG. 3 illustrates a donut shaped cookie.

As a result of actuating the upper platform member 2, two different cookies are made, one by the interior cutting member 3 and another by the exterior cutting members 5. When both the interior cutting members 3 and the exterior cutting members 5 are circular, an outer donut-shaped cookie is made by the exterior cutting members 5 and a solid round cookie is formed by the interior cutting members 3. The shape of such donut-shaped cookies 10 are shown in FIG. 3.

In other embodiments, the interior and exterior cutting members can have different shapes than circular. For example, the shapes may be heart, star, square, rectangular, round, shapes with serrated edges, elliptical, and many other shapes. Furthermore, the interior and exterior cutting members can have different shapes than one another. For example, the inner cutting members could be heart shaped while the outer cutting members are circular shaped.

Another example would be for the exterior cutting members to have a star shape while the interior members have a circular shape. This way two different cookies could be produced (one by the exterior cutting member, and the other by the interior cutting member) merely by pushing the cutter device on prepared dough and actuating the upper platform member.

As previously discussed, the interior cutting members 3 are hollowed and have an aperture at each end, one at the upper platform member 2, and the other at the interior cutting surface 8, thereby forming a hollowed cylinder. During cutting of the dough by the interior cutting members 3, the dough may stay within the cutting member 3 after cutting. If dough is caught within the cutting members 3 hollowed cylinder it can have the effect of causing a vacuum when the interior cutting members are used to cut following pieces of dough. By this method, the dough cut by the interior cutting member may be contained inside. Accordingly, these pieces could be separated from the dough cut by the exterior cutting member 5.

Furthermore, as illustrated in FIG. 1, a side aperture 5a may be arranged on the exterior cutting members 5. The side aperture 5a permits air to pass therethough during operation of the cutting device. Accordingly, when dough is cut by the exterior members 5, this will prevent the dough from being caught up in the exterior members 5. Therefore, the dough can be cut into shapes and still remain on the table or surface used for cutting.

Figure 4A:
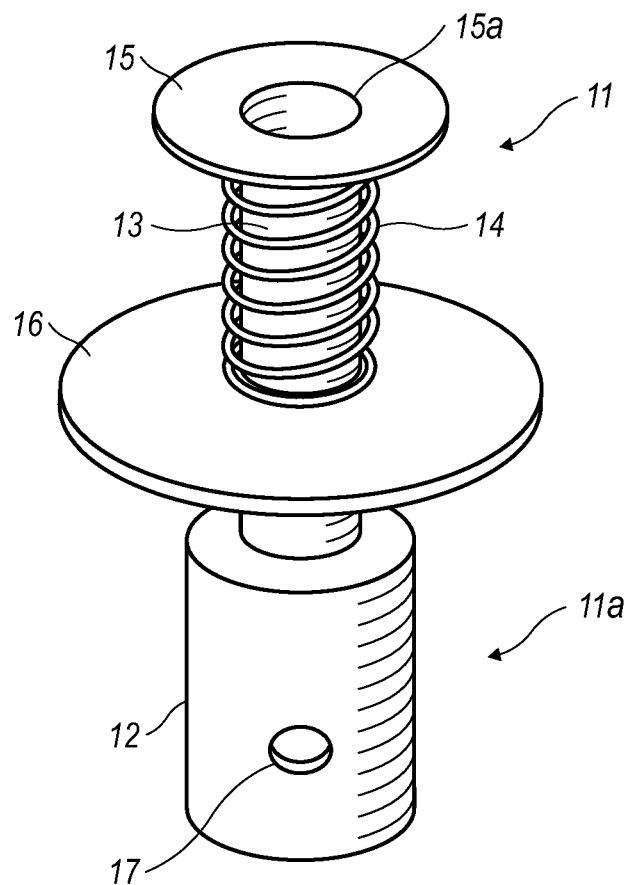
FIG. 4A is a perspective view of a cookie cutting apparatus for concurrently cutting a plurality of cookies separated from upper and lower platform members.

For illustrative purposes, an interior cutting member 11 connected with exterior cutting member 11a is shown in FIG. 4A broken out from the above described platform members. As illustrated, the interior cutting member 11 is insertible into exterior cutting member 11a. A bottom cutting portion 12 is shown in the lower portion of the exterior cutting member 11a, which in the illustrated embodiment is circular. The cutting portion 12 has a cutting surface 12a on its lower end. Furthermore, there is a side aperture 17 on the side of the bottom cutting portion 12, which permits air to pass therethrough. This acts as an aid for preventing the dough cut by the exterior cutting member 11a from being caught up in the member.

Figure 4B:
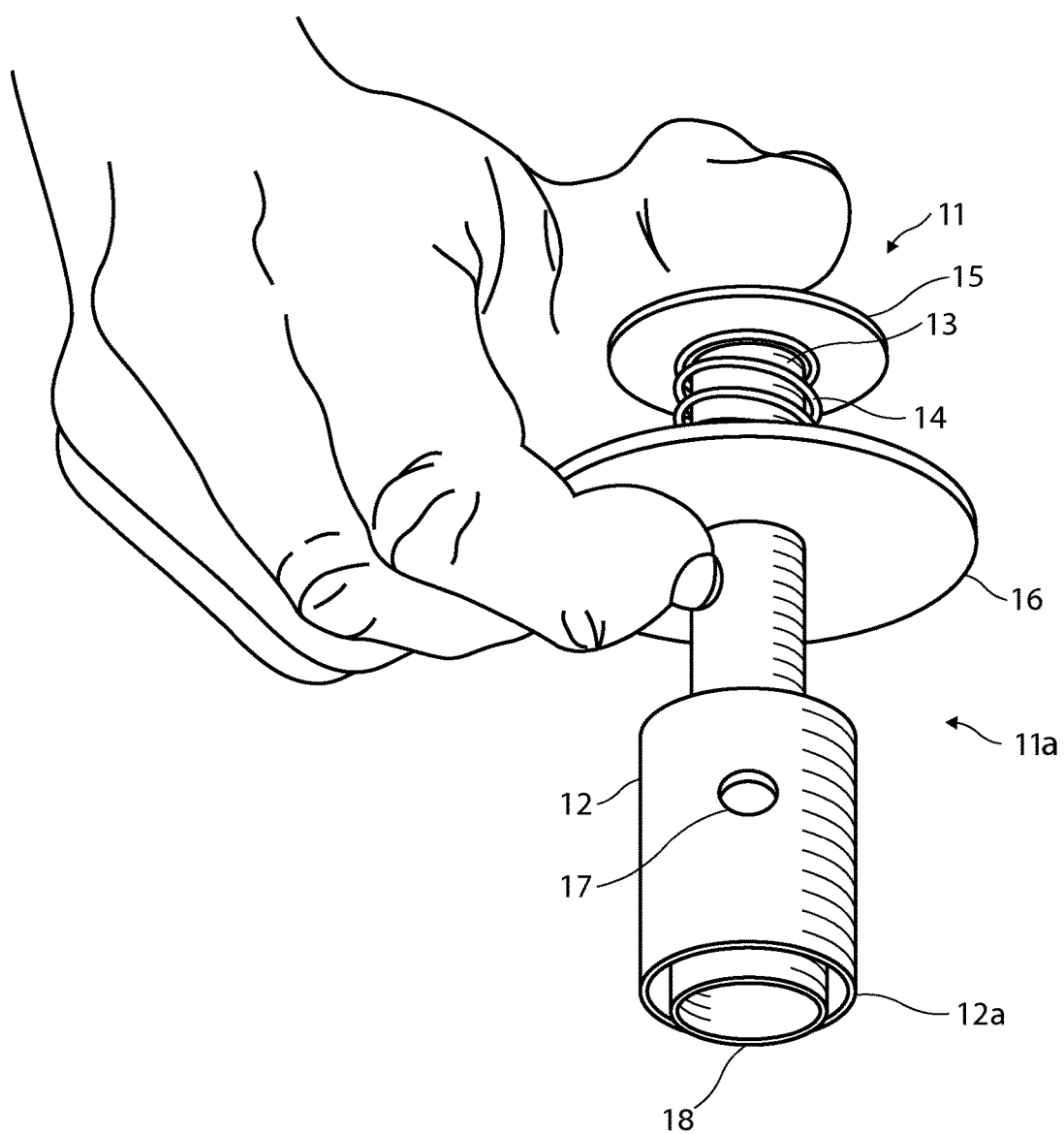
FIG. 4B is a user operated view of the embodiment illustrated in FIG. 4A.

The interior cutting portion 11 has a cylindrical body 13 which is encircled by a biasing spring 14. When inserted into a platform member, upper flange 15 will provide a surface for a user to push down on the interior cutting member 11 and has an aperture 15a arranged in the center thereof. A lower flange 16 is arranged at the top portion of the exterior cutting member 11a. The biasing spring 14 is positioned between the upper flange 15 and lower flange 16. As illustrated in FIG. 4B, when actuated, the upper flange 15 will slidably move toward lower flange 16 thereby compressing the biasing spring 14. Additionally, by this actuation, the interior cutting member 11 will be inserted through the exterior cutting member 11 a. Further, the interior cutting surface 18 of the interior cutting member 11 can extend out from the exterior cutting member 11a. An exterior cutting surface 12a is shown in the lower portion of the exterior cutting member 11a, which in the illustrated embodiment is circular.

Figure 2:
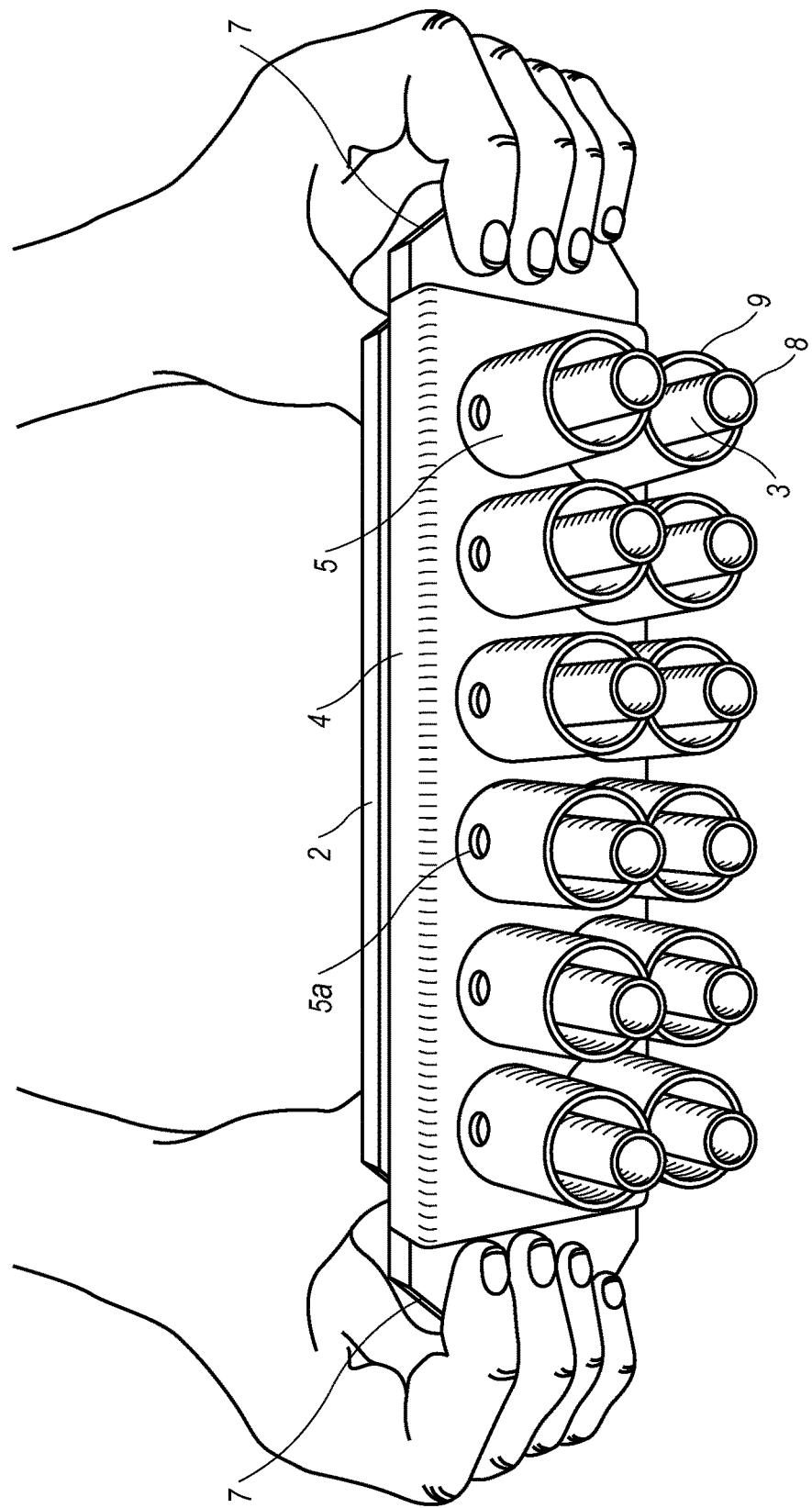
FIG. 2 illustrates a user operated view of the embodiment illustrated in FIG. 1A.

Accordingly, when installed in an upper and lower platform member, upon actuation of the upper platform member as shown in FIG. 2, the biasing spring 14 will be compressed and the cutting surface 18 of the interior cutting member 11 will extend through the exterior cutting member 11a. Upon release of the upper platform member, the biasing spring 14 will urge the upper platform members to its raised configuration. By such actuation, the interior cutting members 11 can be urged through the exterior cutting member 11a to cut cookie dough.

Figure 5A:
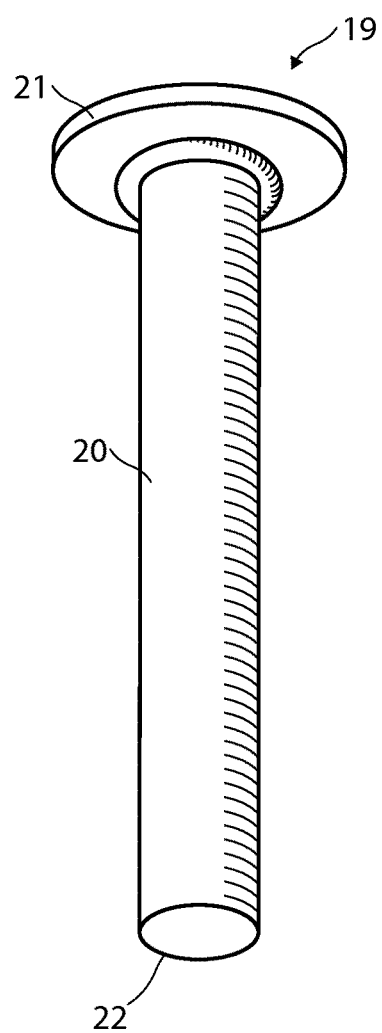
FIG. 5A is a perspective view of a plunging element.
Figure 5B:
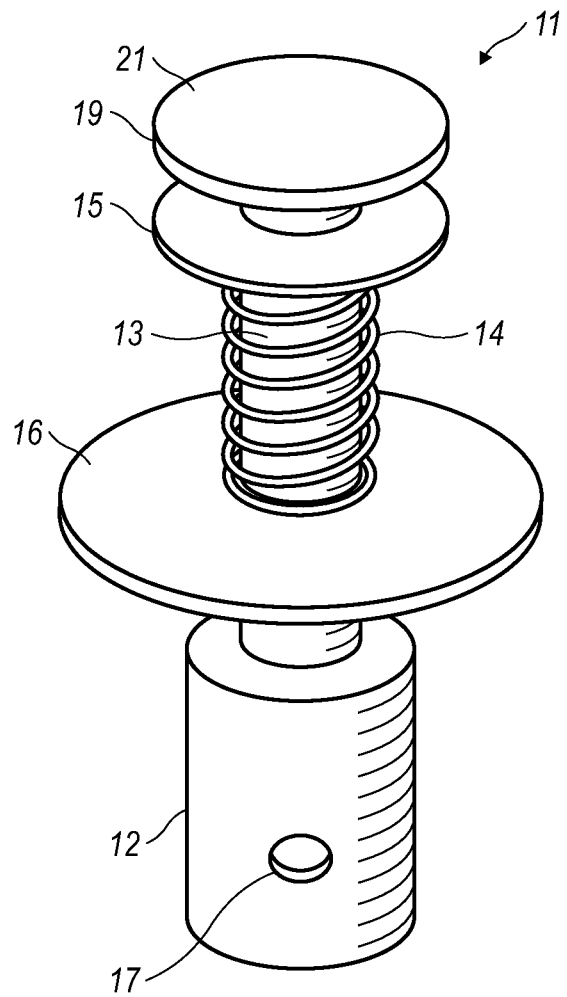
FIG. 5B illustrates a plunging element inserted in the cookie cutting apparatus of FIG. 4A.
Figure 5C:
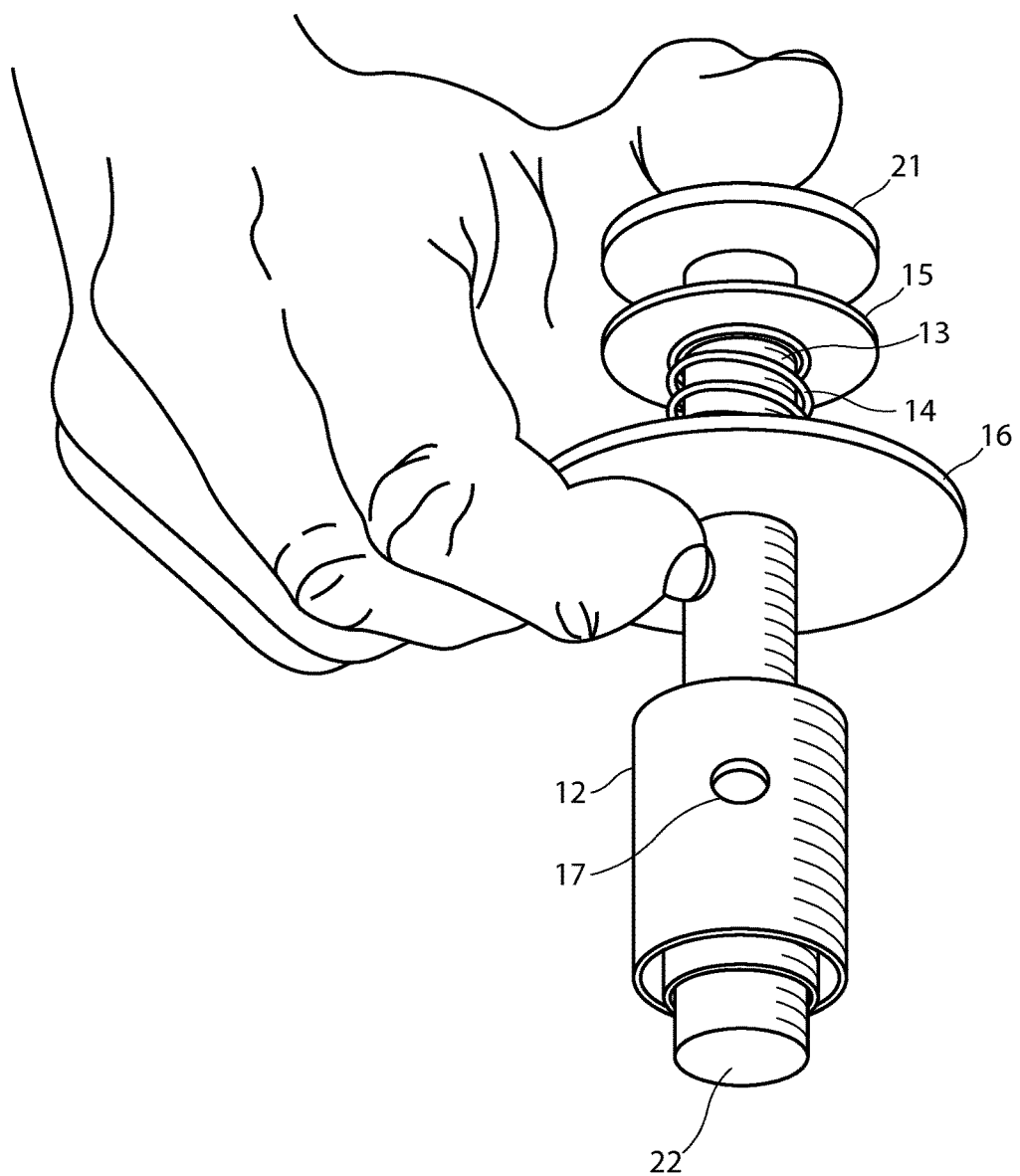
FIG. 5C is a user operated view of the plunging element and the cookie cutting apparatus illustrated in FIG. 5B.

Additionally, as shown in FIG. 5A, a plunging element 19 is disclosed. The plunging element has a longitudinal extension 20 projecting from a flanged head 21. As shown in FIG. 5B, the plunging element 19 can be inserted into the interior and exterior cutting members. Moreover, upon actuation and compression of spring 14, the end 22 of the plunging element can be urged through and extend out from the exterior cutting member 11a as shown in FIG. 5C. The plunging element 19 is preferably longer than the length of the interior cutting member 11 so that when inserted therein, it may expel any dough contained within the interior cutting member 11. Further, upon compression of spring 14, the plunging element 19 may also drive out any dough contained within the exterior cutting member 11 a.

The device and methods disclosed and claimed herein can be made and executed without undue experimentation in light of the present disclosure. While the device and methods of this disclosure have been described in terms of preferred embodiments, it will be apparent to those of skill in the art that variations may be applied to the device and methods and in the steps or in the sequence of steps of the methods described herein without departing from the concept, spirit and scope of the invention. All such similar substitutes and modifications apparent to those skilled in the art are deemed to be within the spirit, scope and concept of the invention as defined by the appended claims.

What is claimed is:

1. A cookie cutting apparatus for concurrently cutting a plurality of cookies in dough, said apparatus comprising:
    an upper platform member having an array of a plurality of interior cutting members, each interior cutting member having a first diameter and a cutting surface on an end thereof,
    a lower platform member having an array of a plurality of exterior cutting members, each exterior cutting member having a second diameter and a cutting surface on an end thereof, said first diameter being smaller than said second diameter,
    said upper platform member arranged above said lower platform member, said interior cutting members respectively aligned with said exterior cutting members along respective vertical axes,
    wherein said upper platform member is actuable from a first configuration, where said array of interior cutting members is in a raised position, to a second configuration, where said array of interior cutting members is in a lowered position and the interior cutting members are respectively telescopically inserted into said exterior cutting members such that the cutting surfaces of said interior cutting members are in substantially the same plane as the cutting surfaces of said exterior cutting members and such that an open space is disposed between the respective interior and exterior cutting members, and
    said interior cutting members are cylindrical, each having a hollowed interior to cut a circular shape, and
    further comprising at least one plunging element removably inserted into at least one of said interior cutting members.

2. The cookie cutting apparatus of claim 1, wherein a biasing element is interposed between said upper platform member and said lower platform member, thereby biasing said upper platform member to said raised position.

3. The cookie cutting apparatus of claim 1, wherein said exterior cutting members are cylindrical, each having a hollowed interior to cut a circular shape.

4. The cookie cutting apparatus of claim 1, wherein said exterior cutting members each have an aperture to allow air to escape.

5. The cookie cutting apparatus of claim 1, wherein said upper and said lower platform members each have a substantially rectangular shape with a length of one of the platform members extending in one longitudinal direction longer than a length of the other of the platform members in said one longitudinal direction.

6. The cookie cutting apparatus of claim 1, wherein said lower platform member has lateral extension member which extends beyond a length of said upper platform member for gripping by a user.

7. The cookie cutter apparatus of claim 6, wherein the lateral extension member comprises at least one handle.

8. The cookie cutter apparatus of claim 1, wherein said array of interior cutting members is arranged in a two by six matrix and said array of exterior cutting members is arranged in a two by six matrix.

9. The cookie cutter apparatus of claim 1, wherein said array of interior cutting members consists of twelve cutting members.

10. The cookie cutter apparatus of claim 1, wherein said array of exterior cutting members consists of twelve cutting members.

11. The cookie cutting apparatus of claim 1, wherein the number of plunging elements corresponds to the number of interior cutting members.

\* \* \* \* \*